UNITED STATES PATENT OFFICE.

ROBERT CAMBIER, AUGUSTE TIXIER, AND CHARLES EMILE ADNET, OF PARIS, FRANCE, ASSIGNORS TO SPECIAL PRODUCTS COMPANY, A CORPORATION OF NEW JERSEY.

PROCESS OF STERILIZING WATER, &c.

No. 892,580.　　　　Specification of Letters Patent.　　　Patented July 7, 1908.

Application filed January 19, 1904. Serial No. 189,710.

*To all whom it may concern:*

Be it known that we, ROBERT CAMBIER, AUGUSTE TIXIER, and CHARLES EMILE ADNET, citizens of the Republic of France, and residents of 26 Rue Vauquelin, Paris, in the said Republic, chemists, have invented certain new and useful Improvements in Processes for Sterilizing Water; and we do hereby declare the following to be a full, clear, and exact description of the invention, such as will enable others skilled in the art to which it appertains to make and use the same.

This invention consists in a process for sterilizing liquids, particularly water, based on the use of barium manganate which is easily attackable by impurities *i. e.* the sterilization has for its object to destroy or render harmless to the human organism impurities consisting of organic compounds and micro-organisms that are contained in water or other liquids.

When aerated water containing impurities of harmful organic compounds or micro-organisms or both is made to traverse a bed of barium manganate, whether alone or mixed with fine sand or other inert body such as ground or broken glass or porcelain, the manganate is attacked, during the passage of the water, by the carbonic acid and the oxygen dissolved in the latter. The equation for the reaction may be written as follows:—

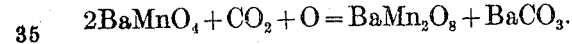
$$2BaMnO_4 + CO_2 + O = BaMn_2O_8 + BaCO_3.$$

If, as a consequence of the conditions of aeration and the speed of filtration, the carbonic acid is in excess, barium bicarbonate is also formed in accordance with the equation:—

$$BaCO_3 + CO_2 + H_2O = BaH_2(CO_3)_2.$$

These reactions may be combined into a single equation:—

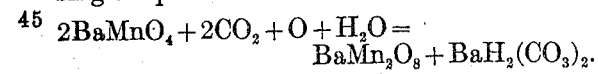
$$2BaMnO_4 + 2CO_2 + O + H_2O = BaMn_2O_8 + BaH_2(CO_3)_2.$$

If the water does not contain sulfates or only contains an insufficient quantity of them, it will retain traces of barium in solution due to the slight solubility of the barium manganate; these may be easily eliminated by adding feeble traces of any sulfate, natural strontium sulfate, for example, either to the water before or after its passage through the manganate, or to the latter. By this procedure the barium is completely precipitated and the water issues from the filter rose colored by traces of the permanganate of the base whose sulfate was used for eliminating the barium. These reactions occur in the bed of barium manganate in the conditions of the special mass; the water which runs rose colored from the filter is perfectly sterile and deprived of organic matter.

It is essential, in order to procure sterilization, that the water should be acid; if it does not contain sufficient carbonic acid either free or as bicarbonate, it issues colorless and is not sterile. To remedy this it suffices to add to the water before it passes through the filter of barium manganate, traces of mineral acid, (sulfuric, nitric, hydrochloric, phosphoric, carbonic, etc.) The rose colored, sterilized water thus obtained may be used directly for a number of purposes, such as washing, dressing wounds, the needs of hygiene, fermentation industries, etc., but it is not suited for drinking because of the special flavor that the traces of the permanganate which it contains impart to it. When necessary, it is easy to remove this flavor by adding to the rose colored water a trace of any reducing agent, such as ferrous sulfate, bisulfite, etc., which will eliminate at the same time the barium, and then filtering the water. To the same end the water may be filtered through a bed of some reducing agent, such as old iron, spathic iron ore, etc. using an appropriate apparatus.

Having thus described the nature of our said invention and the best means we know of carrying the same into practical effect, we claim:—

1. The process of sterilizing water containing an acid and containing harmful organic impurities or micro-organisms, comprising the passing of the liquid through a bed composed of barium manganate.

2. The process of sterilizing water containing an acid and containing harmful organic impurities or micro-organisms, comprising the addition of a sulfate to the liquid and filtering through a bed of barium manganate.

3. The process of sterilizing water containing harmful organic impurities or microorganisms, comprising the addition of a mineral acid and a sulfate to the liquid and filtering through a bed of barium manganate.

4. The process of sterilizing water containing harmful organic impurities or microorganisms, comprising the addition of a mineral acid and a sulfate to the liquid, filtering through a bed of barium manganate and finally acting on the filtrate with a reducing agent.

In testimony that we claim the foregoing as our invention, we have signed our names in presence of two subscribing witnesses.

ROBERT CAMBIER.
AUGUSTE TIXIER.
CHARLES EMILE ADNET.

Witnesses:
  HANSON C. COXE,
  ALCIDE FABE.